United States Patent
Oshins

(10) Patent No.: US 8,769,530 B2
(45) Date of Patent: Jul. 1, 2014

(54) MIGRATING A VIRTUAL MACHINE THAT OWNS A RESOURCE SUCH AS A HARDWARE DEVICE

(75) Inventor: Jacob Oshins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 275 days.

(21) Appl. No.: 12/869,628

(22) Filed: Aug. 26, 2010

(65) Prior Publication Data
US 2010/0325282 A1    Dec. 23, 2010

Related U.S. Application Data

(63) Continuation of application No. 11/363,897, filed on Feb. 28, 2006, now Pat. No. 7,788,665.

(51) Int. Cl.
G06F 9/455 (2006.01)
G06F 9/46 (2006.01)
G06F 15/173 (2006.01)

(52) U.S. Cl.
USPC .............................................. 718/1; 718/104

(58) Field of Classification Search
None
See application file for complete search history.

(56) References Cited

U.S. PATENT DOCUMENTS

| | | | |
|---|---|---|---|
| 6,854,115 B1 | 2/2005 | Traversat et al. | |
| 6,934,755 B1 | 8/2005 | Saulpaugh et al. | |
| 7,065,549 B2 * | 6/2006 | Sun et al. | 709/201 |
| 7,257,811 B2 | 8/2007 | Hunt et al. | |
| 7,424,710 B1 | 9/2008 | Nelson et al. | |
| 7,464,019 B1 | 12/2008 | Serrano et al. | |
| 7,552,436 B2 | 6/2009 | Brice, Jr. et al. | |
| 7,788,665 B2 | 8/2010 | Oshins | |
| 2003/0187915 A1 | 10/2003 | Sun et al. | |
| 2004/0010787 A1 | 1/2004 | Traut et al. | |
| 2005/0198632 A1 | 9/2005 | Lantz et al. | |
| 2005/0251802 A1 | 11/2005 | Bozek et al. | |

(Continued)

FOREIGN PATENT DOCUMENTS

| | | |
|---|---|---|
| JP | 10-283210 A | 10/1998 |
| JP | 2002-183088 A | 6/2002 |
| JP | 2002-215416 A | 8/2002 |
| JP | 2005-327279 A | 11/2005 |

OTHER PUBLICATIONS

"The Dell and VMware Alliance", www1.us.dell.com-content-topics-global.aspx-alliances-en-vmware—resources?c=us&cs=555&1=en&s=biz, accessed Apr. 18, 2006, 2 pages.

Clark et al., "Live Migration of Virtual Machines", NSDI'05 Proceedings of the 2nd conference on Symposium on Networked Systems Design & Implementation, 2005, 2, 14 pages.

(Continued)

*Primary Examiner* — Kenneth Tang
(74) *Attorney, Agent, or Firm* — John Jardine; Andrew Sanders; Micky Minhas

(57) ABSTRACT

A computing device has first and second virtual machines (VMs) and a resource assigned to the first VM. Each access request for the resource is forwarded thereto until the first VM is to be saved or migrated. Thereafter, each access request is forwarded to a holding queue. When the resource has acted upon all access requests forwarded thereto, the resource is reassigned to the second VM, and each access request at the holding queue is forwarded to the second VM and then the resource. Thus, all access requests for the resource are acted upon by the resource even after the resource is removed from the first VM and assigned to the second VM, and the save or migrate of the first VM can thereafter be completed.

20 Claims, 6 Drawing Sheets

(56) References Cited

U.S. PATENT DOCUMENTS

| | | |
|---|---|---|
| 2005/0268298 A1 | 12/2005 | Hunt et al. |
| 2006/0005189 A1 | 1/2006 | Vega et al. |
| 2006/0059336 A1 | 3/2006 | Miller et al. |
| 2006/0200820 A1* | 9/2006 | Cherkasova et al. ............. 718/1 |
| 2007/0039050 A1 | 2/2007 | Aksenov et al. |

OTHER PUBLICATIONS

PCT Application No. PCT/US2007/004047: International Search Report and Written Opinion of the International Searching Authority, Jul. 18, 2007, 9 pages.

* cited by examiner

MIGRATING A VIRTUAL MACHINE THAT OWNS A RESOURCE SUCH AS A HARDWARE DEVICE

CROSS REFERENCE TO RELATED CASES

This application is a continuation of U.S. patent application Ser. No. 11/363,897 filed on Feb. 28, 2006, now U.S. Pat. No. 7,788,665, issued on Aug. 31, 2010, the entirety which is incorporated herein by reference.

TECHNICAL FIELD

The present invention relates to a method and mechanism that may be employed to migrate a virtual machine which owns a resource such as a hardware device or another physical device from a first machine or platform to a second machine or platform. In particular, the present invention relates to such a method and mechanism that allows migrating such a virtual machine without losing any state information relating to the resource.

BACKGROUND

As should be appreciated, a virtual machine is a software construct or the like operating on a computing device or the like for the purpose of emulating a hardware system. Typically, although not necessarily, the virtual machine is an application or the like and is employed on the computing device to host a user application or the like while at the same time isolating such user application from such computing device or from other applications on such computing device. A different variation of a virtual machine may for example be written for each of a plurality of different computing devices so that any user application written for the virtual machine can be operated on any of the different computing devices. Thus, a different variation of the user application for each different computing device is not needed.

New architectures for computing devices and new software now allow a single computing device to instantiate and run a plurality of partitions, each of which can be employed to instantiate a virtual machine to in turn host an instance of an operating system upon which one or more applications may be instantiated. Typically, although not necessarily, the computing device includes a virtualization layer with a virtual machine monitor or the like that acts as an overseer application or 'hypervisor', where the virtualization layer oversees and/or otherwise manages supervisory aspects of each virtual machine, and acts as a possible link between each virtual machine and the world outside of such virtual machine.

Among other things, a particular virtual machine on a computing device may require access to a resource associated with the computing device. As may be appreciated, such resource may be any sort of resource that can be associated with a computing device. For example, the resource may be a storage device to store and retrieve data, and generally for any purpose that a storage device would be employed. Likewise, the resource may be any other asset such as a network, a printer, a scanner, a network drive, a virtual drive, a server, and the like. Accordingly, whatever the resource may be, the virtual machine may in fact be provided with access to services provided by such resource.

In a computing device with multiple partitions instantiated, any particular resource of the computing device may be dynamically assigned to a particular partition/virtual machine (hereinafter 'virtual machine' or 'VM') so that the particular VM can directly control such resource and service requests for the resource from other VMs on the computing device. Such particular VM, then, is in effect a host that provides resource capabilities as a resource host VM ('VM-H') that 'owns' the particular resource. Similarly, such VM-H provides resource services to another VM which is in effect a client that consumes such capabilities as a resource client VM ('VM-C'). Thus, the VM-C and the VM-H in combination accomplish operations that require use of the particular resource.

A particular VM-C operating on a computing device typically is constructed to operate as if a real machine. That is, the particular VM-C in accessing a particular resource typically acts as if such particular resource is accessible by way of direct requests thereto. Accordingly, it may be the case that the VM-C has constructed a path or stack (hereinafter, 'stack') of drivers to which such requests are directed, with the expectation being that the particular resource is at the end of the stack. As has been established, however, the VM-C is not in fact a real machine and the particular resource is not in fact at the end of the stack.

Accordingly, it may be the case that the resource is emulated by the virtualization layer/virtual machine monitor as being at the end of the stack. In reality, the virtualization layer forwards a request for the resource to the VM-H that owns or has access to such resource. Similarly, it may be the case that the VM-C may be endowed with enlightened capabilities in which such VM-C is aware of the virtual existence thereof, and sends requests to the particular resource by way of an 'enlightened' stack at the end of which is a VM bus or other communications path that connects the VM-C with the VM-H that owns or has access to the resource, where the VM bus bypasses the virtualization layer. Also similarly, it may be the case that the VM-C with enlightened capabilities sends requests to the particular resource by way of a virtual pipe between the VM-C and the VM-H as implemented with the VM bus. Whatever communications protocol is employed, the VM-C accesses the particular resource by way of the VM-H, and accordingly each request sent by the VM-C to the particular resource follows a path to the particular resource by way of the corresponding VM-H.

Particularly with regard to the VM-H that owns the particular resource, then, it should be appreciated that such VM-H may directly access the resource by way of an appropriate adapter for the resource that is assigned to the VM-H. Typically, although not necessarily, the adapter is a piece of hardware or software on the computing device of the VM-H, where such hardware or software interfaces the resource to the VM-H. For example, such adapter may be a network interface card or a video card, or the software equivalent. With direct access to such adapter, then, the VM-H can employ the resource with a relatively high degree of efficiency and performance. Note here that a particular resource may have multiple corresponding adapters each potentially assigned to a particular VM-H, and accordingly multiple VM-Hs can own a particular resource. However, only one VM-H can be assigned to or 'own' a particular adapter at any one time, at least typically. At any rate, it can typically be assumed that ownership of a particular adapter is tantamount to ownership of the resource of the particular adapter.

One hallmark of a VM is that the VM as a virtual construct can be halted and re-started at will, and also that the VM upon being halted can be saved, retrieved, and re-started at will. In particular, the VM as instantiated on a particular computing device is a singular software construct that can be neatly packaged inasmuch as the software construct includes all data relating to such VM, including operating data and state information relating to the VM. As a result, a VM on a first computing device can be moved or 'migrated' to a second computing device by halting the VM at the first computing device, moving the halted VM to the second device, and re-starting the moved VM at the second computing device, or the like. More generally, a VM can be migrated from a first platform to a second platform in a similar manner, where the platforms represent different computing devices or different configurations of the same computing device. In the latter case, and as should be appreciated, a computing device may have a different configuration if, for example, additional memory is added, a processor is changed, an additional input device is provided, a selection device is removed, etc.

Note, though, that at times not all of the state information relating to a VM is included within the software construct of such VM. In particular, a VM-H that owns a resource or an adapter thereof may have particular state information relating to the resource stored with such resource or with such adapter thereof. As but one example, if a VM-H owns a resource which is a network and the corresponding adapter as owned by the VM-H is a network interface card, it may be the case that state information such as certain read and write commands for the network are stored in the network interface card, at least temporarily until acted upon. As another example, if the resource is an optical disk reading drive with an included adapter, it may likewise be the case that state information such as certain read commands for the drive are stored in such drive. As still another example, if the resource is a printer and the corresponding adapter includes a print spooler, it may also likewise be the case that state information such as certain write commands for the printer are stored in such spooler.

At any rate, it is to be understood that when a portion of the state information of a VM is not included within the software construct of the VM, such as may be the case when a VM-H owns a resource and stores state information with the resource, migrating the VM from a first platform to a second platform becomes more difficult. In particular, such migrating should not take place until the state information at the resource is dealt with such that such state information at the resource is not lost or otherwise permanently separated from the VM.

Thus, a need exists for dealing with state information of a VM-H at a resource owned thereby when the VM-H is to be migrated from a first platform to a second platform. In particular, a need exists for a method and mechanism by which the state information at the resource can be deleted from the resource in the ordinary operation thereof prior to the migration, or else can be stored for later retrieval by the VM-H after the migration, or else can be processed by another VM-H.

SUMMARY OF THE INVENTION

The aforementioned needs are satisfied at least in part by the present invention in which a computing system has a resource for providing a resource service and a computing device having first and second virtual machines (VMs) instantiated thereon. Each VM hosts an instance of an operating system upon which one or more applications may be instantiated. The first VM is initially communicatively coupled to the resource and the resource is initially assigned to the first VM such that the first VM initially owns the resource and the service provided thereby. The first VM is a software construct on the computing device that can be saved and migrated from a first platform to a second platform.

The first VM includes a resource stack corresponding to and accessing the resource according to access requests sent by way of such resource stack, a first port communicatively coupled to the resource, a second port communicatively coupled to a communications medium, and a port redirector communicatively coupled to the resource stack, the first port and the second port. The port redirector forwards each access request from the resource stack to be queued at one of the first port and the second port.

In particular, the port redirector forwards each access request from the resource stack to be queued at the first port until the first VM is directed to be saved or migrated. Each access request at the first port is further forwarded in turn to the resource to be acted upon by such resource. When the first VM is directed to be saved or migrated and thereafter, the port redirector forwards each access request from the resource stack to the second port. Each access request at the second port is further forwarded in turn only after the resource has acted upon all access requests queued at the first port and thereafter has been removed from being owned by the first VM.

The second VM subsequently is communicatively coupled to the resource and the resource is subsequently assigned to the second VM after the resource is removed from the first VM such that the second VM subsequently owns the resource and the service provided thereby. The second VM as owner of the resource is communicatively coupled to the second port of the first VM by way of the communications medium, and each access request at the second port is further forwarded in turn to the second VM by way of the communications medium and then further forwarded in turn to the resource by way of the second VM to be acted upon by such resource. Accordingly, all access requests from the resource stack of the first VM are acted upon by the resource in turn even after the resource is removed from the first VM and assigned to the second VM and the save or migrate can thereafter be completed.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF ILLUSTRATIVE EMBODIMENTS

Computer Environment

Figure 1:
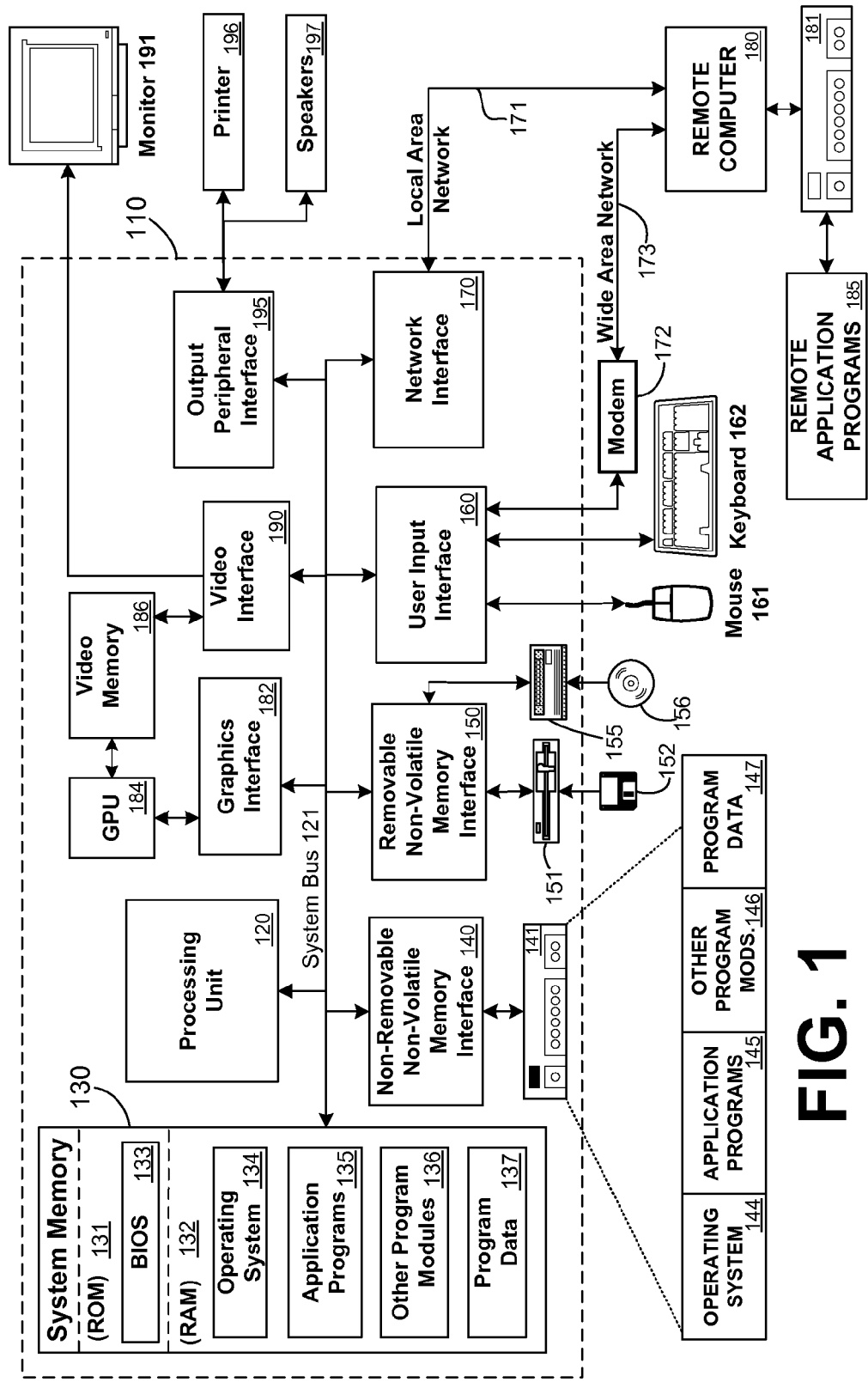
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI Express.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection or fiber optic connection, and wireless media such as acoustic, RF, infrared, optical, phased-array antenna operating at any wavelength, directional and non-directional electromagnetic emitters and receivers operating at any wavelength, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
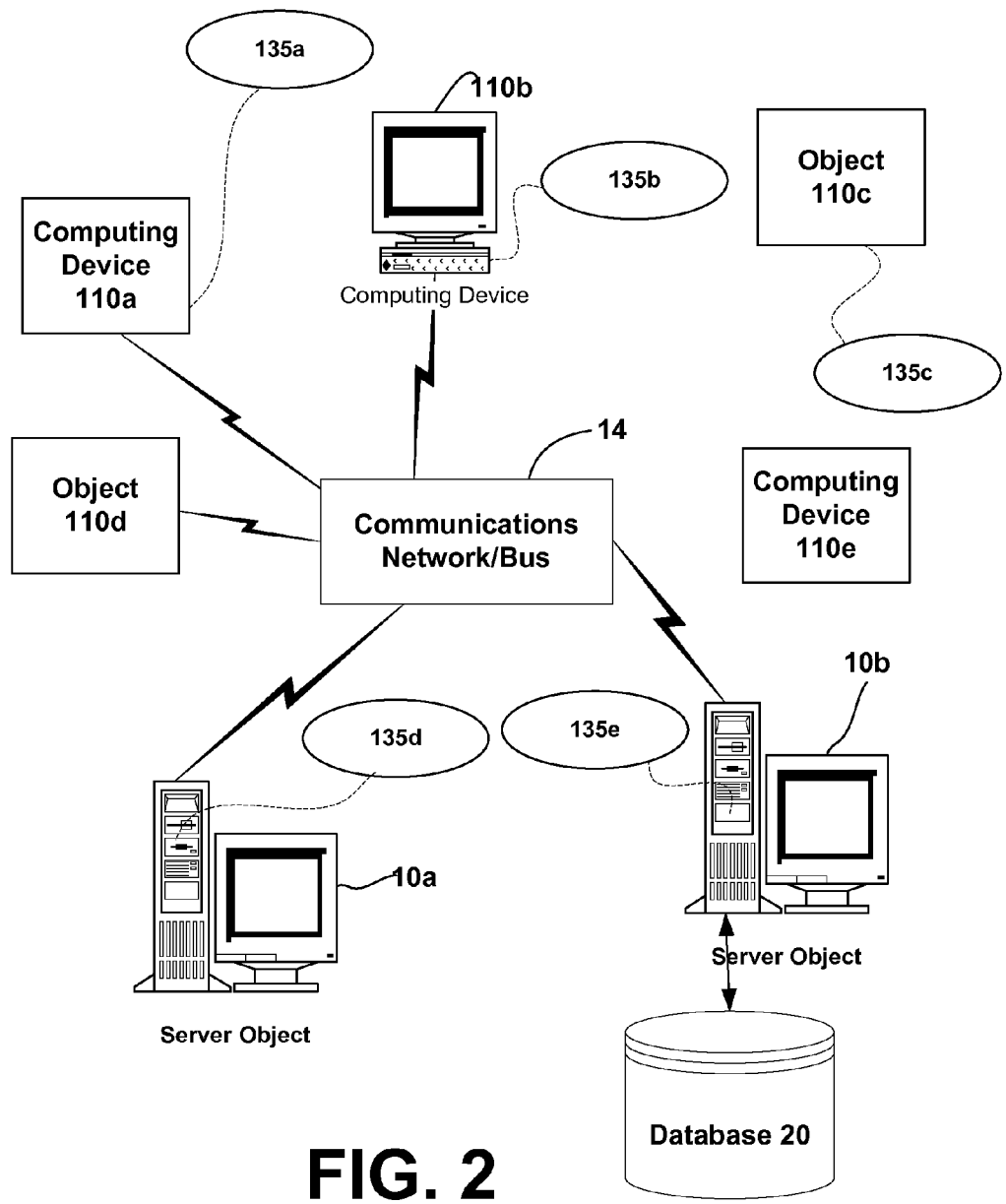
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wire-line or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers processing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source, and to any computing device with which it is desirable to render high performance graphics generated by a virtual machine.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Partitioned Computing Device

Figure 3:
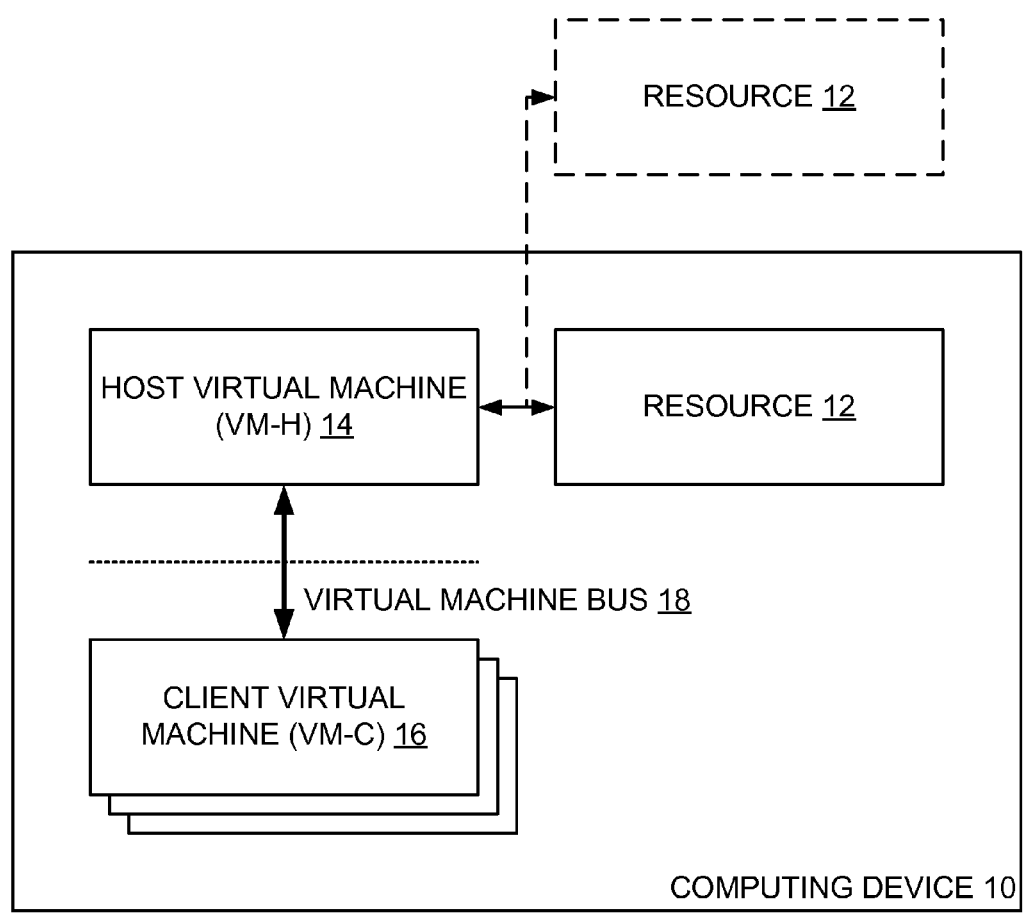
FIG. 3 is a block diagram showing a computing device running a plurality of partitions including a host partition with a virtual machine (VM-H) that owns a particular resource and provides resource services therefore, and a client partition with a virtual machine (VM-C) that employs the resource services of the VM-H in accordance with embodiments of the present invention.

Turning now to FIG. 3, a computing device 10 includes or has access to a particular resource 12 that is employed to provide a resource service to the computing device 10. Such computing device 10, resource 12, and resource service may be any appropriate computing device, resource, and resource service without departing from the spirit and scope of the present invention. For example, the computing device 10 may be a personal computer such as a desktop or laptop computer or the like with a hard disk drive as the resource 12 providing data storage services. Likewise, the computing device 10 may be a portable playback machine such as a portable audio or video player with a display screen as the resource 12 providing display services. Similarly, the computing device 10 may be a server machine with a data communications network as the resource 12 providing communications services. In a similar manner, the server machine may itself be the resource 12. Note that the resource 12 may be a particular piece of hardware, an adapter for accessing a particular piece of hardware, a remote service, a local service, a combination thereof, and the like.

Significantly, the computing device 10 has been configured to run a plurality of partitions, where each partition can be employed to instantiate a virtual machine to in turn host an instance of an operating system upon which one or more applications may be instantiated. As seen, in such computing device 10, the particular resource 12 of the computing device 10 is assigned to a particular partition or virtual machine 14

(hereinafter, VM 14) so that the particular VM 14 can directly control such particular resource 12. Such particular VM 14, then, is a host that provides resource capabilities ('VM-H 14'). Similarly, such VM-H 14 provides resource services to one or more other VMs 16, each of which is in effect a client that consumes such services ('VM-C 16'). Typically, each VM-C 16 and the VM-H 14 communicate by way of a pipe or channel such as a virtual machine (VM) bus 18 or the like to accomplish resource-related operations.

The VM bus 18 may be established as an object in and of itself on the computing device 10, or may instead be established as a conceptual object that does not in and of itself exist, without departing from the spirit and scope of the present invention. In the latter case, and as should be appreciated, such conceptual VM bus 18 is manifested as a communications conduit between VMs 14, 16 when such VMs 14, 16 choose to establish communications therebetween. In particular, the manifestation of such VM bus 18 may be considered to arise when, in the course of the VMs 14, 16 choosing to communicate therebetween, such VMs 14, each establish the necessary services for such communication and in fact employ such services to so communicate. In such instance, the communications may occur over any appropriate communications medium within the computing device 10 without departing from the spirit and scope of the present invention.

The computing device 10 of FIG. 3 and each VM 14, 16 thereof may be functionally operated to include both a user mode and a kernel mode, although such modes are not perceived to be absolutely necessary for purposes of the present invention. At any rate, and as may be appreciated, the user mode is a generally non-privileged state where executing code is forbidden by the hardware from performing certain operations, such as for example writing to memory not assigned to such code. Generally such forbidden operations are those which could destabilize the operating system of the VM 14, 16 or constitute a security risk. In terms of the operating system, the user mode is an analogous non-privileged execution mode where the running code is forbidden by the kernel from performing potentially dangerous operations such as writing to system configuration files, killing other processes, rebooting the system, and the like.

As may also be appreciated, the kernel mode or privileged mode is the mode in which the operating system and related core components run. Code running in the kernel mode has unlimited access to the system memory and resources that are assigned to the VMs/partitions 14, 16. Generally, the amount of code running in kernel mode is minimized, both for purposes of security and elegance. Roughly speaking, a user of a computing device 10 interfaces therewith most directly through the user mode and applications operating therein, while the computing device 10 interfaces with resources, including the particular resource 12, most directly through the kernel mode.

Migrating a VM-H 14 Owning Hardware Resource 12

As was pointed out above, a VM 14, 16 as a virtual construct can be halted, saved, retrieved, and re-started at will. As a result, a VM 14, 16 on a first platform as saved can be moved or 'migrated' to a second platform, where the platforms represent different computing devices or different configurations of the same computing device. Thus, a VM 14, 16 that is a web server, for example, may be halted from running on a first physical machine, migrated, and re-started on a second physical machine without any clients of the web server even knowing that such web server was moved. With such migration, then, the first physical machine can be taken off-line for maintenance or reconfiguration without interrupting the work running thereon. In addition, such migration allows a group of physical machines to dynamically balance load. Similarly, a VM 14, 16 that represents the personal workspace of a user can be moved by the user between computing devices 12 at work, at home, and the like.

Note, though, that at times not all of the state information relating to a VM 14, 16 is included within the software construct of such VM 14, 16. In particular, a VM-H 14 that owns a resource 12 that is a piece of hardware or an adapter thereof may have particular state information relating to the resource 12 stored with such resource 12. In the situation where a portion of the state information of a VM-H 14 in particular is not included within the software construct of such VM-H 14, then, migrating the VM-H 14 from a first platform to a second platform becomes more difficult. In particular, such migrating should not take place until the state information of the VM-H 14 at the resource 12 is dealt with such that such state information at the resource 12 is not lost or otherwise permanently separated from the VM-H 14.

In one scenario where the VM-H 14 can tolerate an interruption in the use of the hardware resource 12, the state information at the resource 12 is relatively benign in nature and likely can be acted upon and deleted from the resource 12 prior to halting the VM-H 14 for migration thereof. For example, if the resource 12 is a printer and the state information relates to a print job, the print job can be allowed to complete such that the state information is consumed by the printer, after which ownership of the printer resource 12 may be divested from the VM-H 14 and such VM-H 14 may be migrated.

In another scenario where the VM-H 14 can tolerate an interruption in the use of the hardware resource 12, the state information at the resource 12 is somewhat less benign in nature, but likely can be moved to the VM-H 14 prior to halting the VM-H 14 for migration thereof. For example, if the resource 12 is the same printer as before and the state information relates to the same print job as before, but such print job cannot be completed in a reasonable amount of time, the print job can be halted and the remaining state information relating to the print job can be moved to the VM-H 14 prior to halting the VM-H 14 for migration thereof, after which ownership of the printer resource 12 may again be divested from the VM-H 14 and such VM-H 14 may be migrated. After migration, then, and presuming that the VM-H 14 again owns the same printer resource 12, the remaining state information relating to the print job can be moved from the VM-H 14 to such printer to complete the print job.

However, it can be the case that the aforementioned presumption cannot be made. Thus, the printer resource 12 owned by the VM-H 14 after migration may be an entirely different printer resource 12 such as a different type of printer, or a slightly different printer resource 12 such as the same printer with an upgraded print controller. Significantly, in either case it is likely that the remaining state information relating to the print job cannot be moved from the VM-H 14 to such printer to complete the print job inasmuch as the differing printer resource can no longer recognize or act upon such state information.

Note, too, that a VM-H 14 that owns a resource 12 may include state information at the resource including job lists, internal state machine variables, and the like. If the VM-14 is arbitrarily halted and restarted, the state information at the resource 12 likely will be different and outstanding requests will be, at best, dropped, which can cause the VM-14 to crash. At worst, a driver or the like for the resource 12 will misunderstand the situation and in programming the resource 12 will corrupt memory in the resource 12, again causing the VM-H 14 to crash, and also perhaps causing other VMs 14, 16 on the computing device 10 to crash as well.

Thus, if it can be guaranteed that the VM-H 14 after migration will be re-started on the same computing device 10 and with the same resource 12 available thereto, it can be sufficient to have the operating system of the VM-H 14 move all state information out of the resource 12 and store same with the VM-H 14 prior to migrating same. When the VM-H 14 is re-started after migration, then, the operating system of the VM-H 14 can move the stored state information back to the resource 12 for further action thereby.

However, if such a guarantee cannot be had, or if workload prevents the movement of all of the state information prior to migration, it is to be appreciated that it is often enough to remove or 'eject' the resource 12 from ownership by the VM-H 14 prior to migration. As may be appreciated, such ejecting can be achieved upon appropriate request to the operating system of the VM-H 14. In one embodiment of the present invention, such ejecting is commanded prior to halting the VM-H 14 to be migrated, which causes the operating system of the VM-H 14 to move only that state information out of the resource 12 and into the VM-H 14 which is considered significant, and which is presumably less than all of the state information at the resource 12. As should be understood, after ejection, the resource 12 has no state information relating to the VM-H 14 and is no longer owned by or available to the VM-H 14 either before or after the migration. Thus, after the migration, the VM-H 14 will not attempt to move any state information back to the resource 12 and any possible issues from such a move are thereby avoided. Of course, the VM-H 14 will have to regain ownership of the resource 12 if available and so desired.

In still another scenario, however, the VM-H 14 cannot tolerate an interruption in the use of the hardware resource 12, and the state information at the resource 12 is thus relatively critical in nature. For example, if the resource 12 is the main storage device employed by the VM-H 14, such as a disk drive, access to same is critical to the VM-H 14 or else the operating system of the VM-H 14 will crash. Thus, in such scenario, there is no point in time at which ownership of the disk drive resource 12 may be divested from the VM-H 14 inasmuch as the VM-H 14 must always be able to direct state information to such resource 12. In such scenario, then, some mechanism must be employed to pause operation of the resource 12 and remove any state information of the VM-H 14 therefrom, while at the same time still allowing the VM-H 14 to direct state information toward such resource 12.

Figure 4:
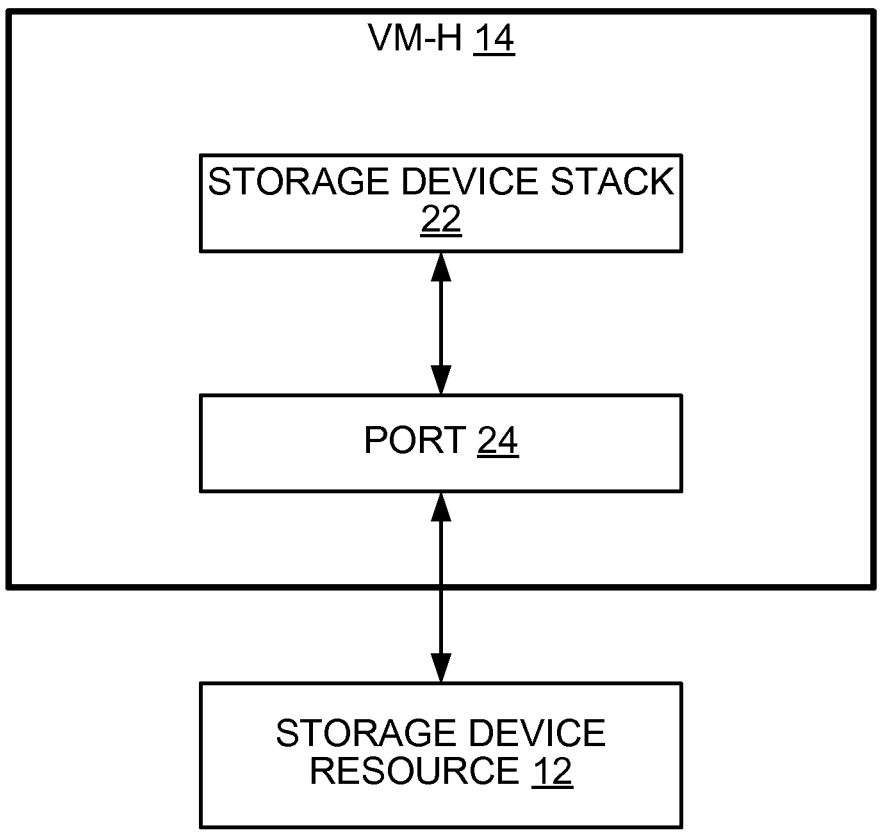
FIG. 4 is a block diagram showing the VM-H of FIG. 3 in additional detail as coupled to a resource owned by such VM-H

Turning now to FIG. 4 it is seen that a typical VM-H 14 accesses a resource 12 such as a storage device resource 12 by way of a storage device stack 22, which may include a file system driver, a partition driver, a volume driver, a disk driver, and the like. Of course, the present invention is not limited to a storage device resource 12, but instead may be any other type of resource 12 without departing from the spirit and scope of the present invention, in which case an appropriate corresponding stack 22 or the like may be employed to access same.

As shown, the storage device stack 22 of FIG. 4 communicates with the storage device resource 12 by way of a port driver 24 or the like (hereinafter, 'port 24' or the equivalent). As may be appreciated, and as is typical, the port 24 translates generic, idealized commands and requests from the storage device stack 22 to commands or requests specific to the storage device resource 12. Notably, if for instance the storage device resource 12 includes a portion of the memory upon which the operating system of the VM-H 14 resides, such storage device resource 12 must be in continuous operation to accept paging requests and the like, or else the operating system of the VM-H 14 will crash. Put simply, in such instance, access to the storage device resource 12 cannot be interrupted, at least insofar as the VM-H 14 must always be able to direct state information in the form of access requests and the like to such storage device resource 12.

Figure 5:
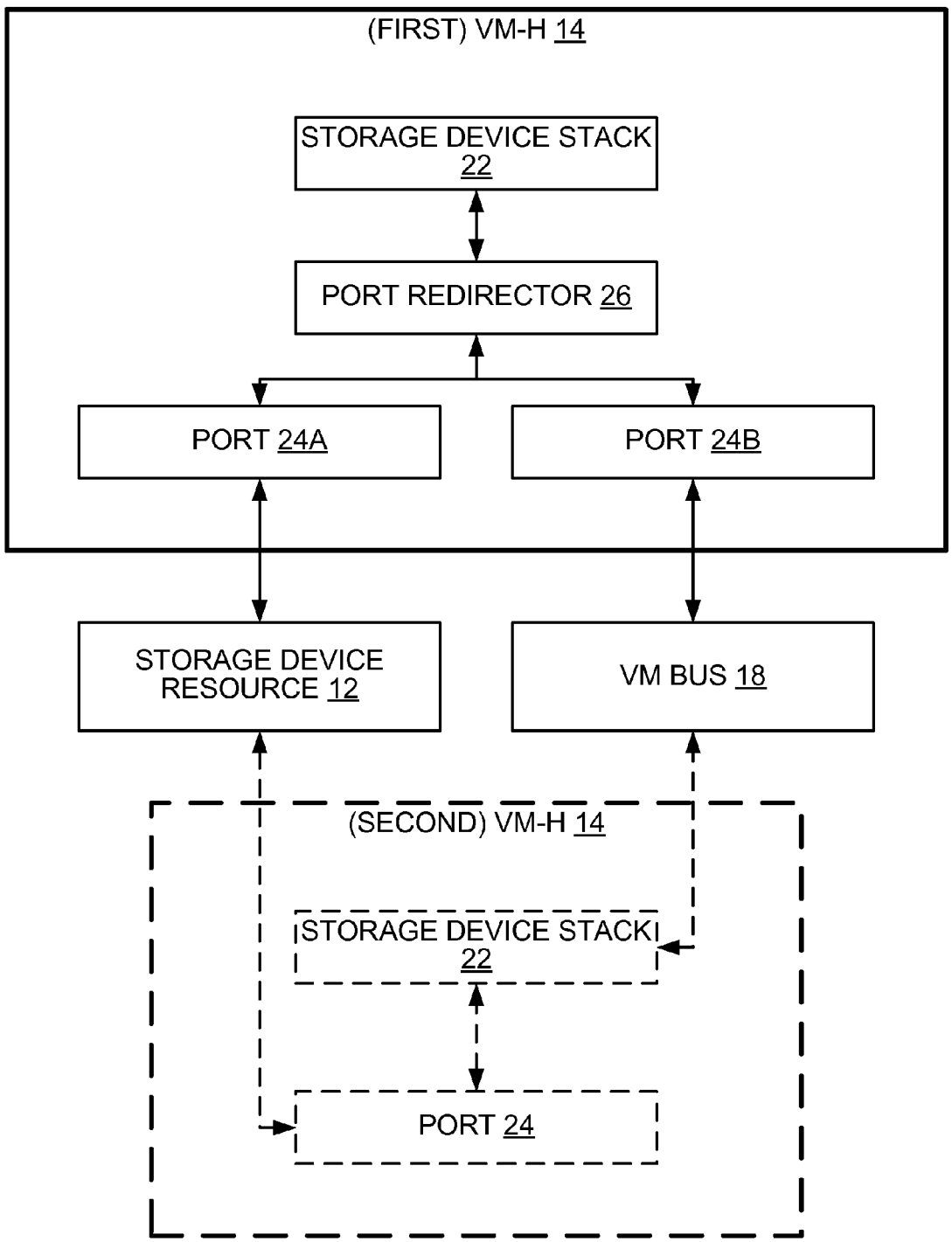
FIG. 5 is a block diagram showing the VM-H of FIG. 3 in additional detail as coupled to a resource owned by such VM-H in accordance with one embodiment of the present invention.

Accordingly, and turning now to FIG. 5, in one embodiment of the present invention, the single port 24 of FIG. 4 is replaced with a pair of ports 24a, 24b, where the port 24a communicatively couples the storage device stack 22 with the storage device resource 12 and the port 24b communicatively couples the storage device stack 22 with an alternate destination by way of a communications medium. As shown, the communications medium is the VM bus 18 and presumably the alternate destination is another VM 14, 16 operating on the computing device 10. However, the alternate destination and the communications medium may be any appropriate alternate destination and communications medium without departing from the spirit and scope of the present invention.

Significantly, in one embodiment of the present invention, and as seen in FIG. 5, each port 24a, 24b is coupled to the storage device stack 22 by way of a port redirector 26. As maybe appreciated, the port redirector 26 directs each access request to the storage device resource 12 either to such storage device resource 12 by way of the port 24a or to the alternate destination by way of the port 24b and communications medium/VM bus 18. Principally, the port redirector 26 determines how to direct each access request in the manner set forth below.

Figure 6:
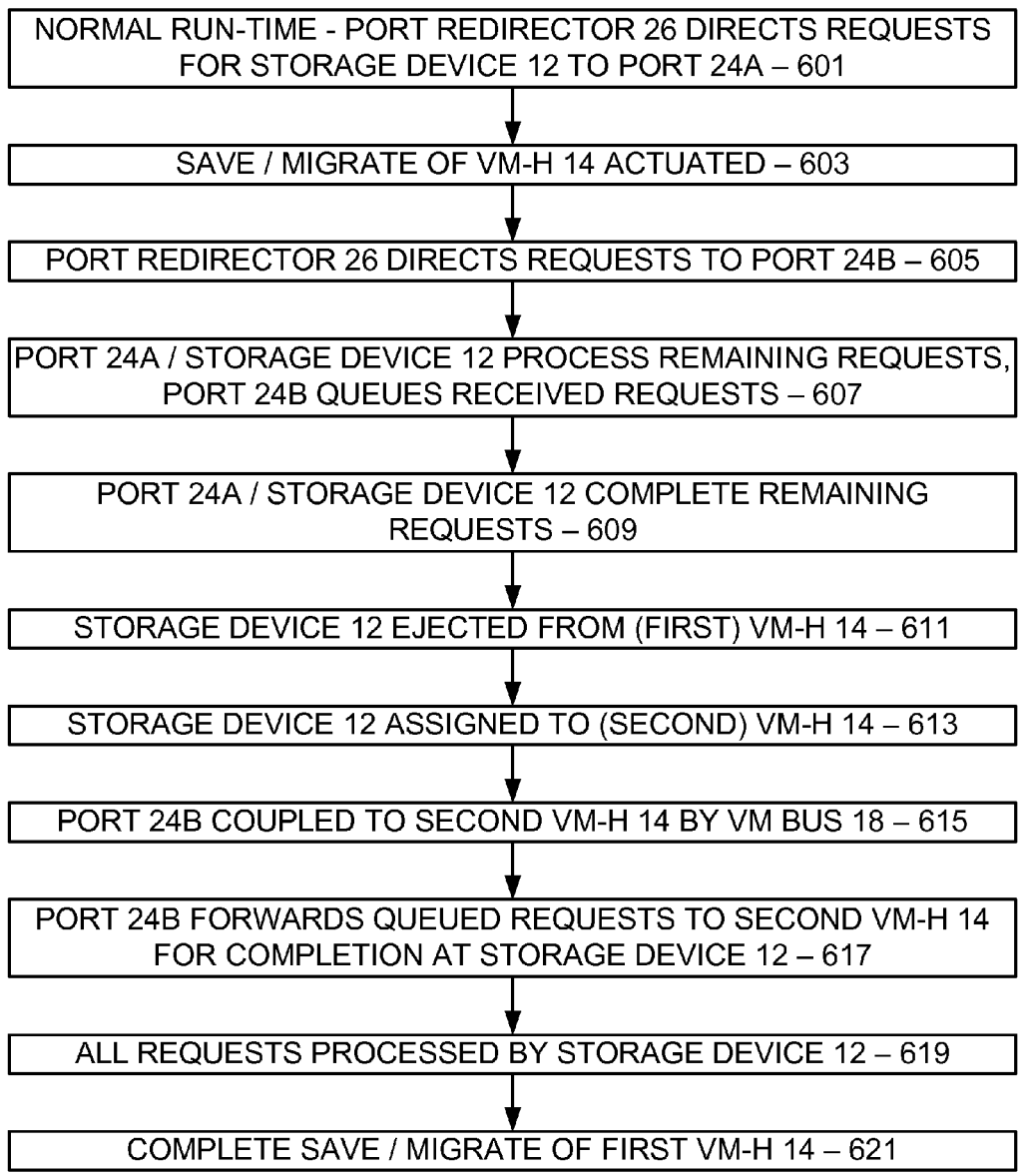
FIG. 6 is a flow diagram showing key steps performed in connection with the VM-H of FIG. 5 to perform a save or migrate of the VM-H while ensuring that all access requests to the resource are properly handled in accordance with one embodiment of the present invention.

Turning now to FIG. 6, and in one embodiment of the present invention, it is seen that a sequence of operations that may be employed to migrate a VM-H 14 that owns a resource 12 such as the storage device resource 12 is shown. Note, too, that such sequence of operations may also be employed to save such a VM-H 14 without necessarily migrating same. Whether migrating or saving, during normal run-time operation of the VM-H 14, the storage device resource 12 is owned by the VM-H 14, the port redirector 26 directs access requests and the like from the storage device stack 22 of the VM-H 14 to the storage device resource 12 by way of the port 24a, and the port 24a and storage device resource 12 queue up and process such access requests and the like (step 601). However, after a save or migrate of the VM-H 14 is actuated, by whatever appropriate source (step 603), the port redirector 26 directs access requests and the like from the storage device stack 22 of the VM-H 14 to the port 24b (step 605).

Initially, the port 24b queues the received access requests and the like while the port 24a and storage device resource 12 process any remaining access requests and the like thereat (step 607). Thus, all access requests or the like at the port 24a and storage device resource 12 are allowed to complete, after which no state information relating to same remains with the storage device resource 12 (step 609). Critically, while such access requests or the like at the port 24a and storage device resource 12 are allowed to complete, further access requests or the like are queued at the port 24b, and such access requests or the like are not denied, ignored, or otherwise repudiated in any way that would cause the operating system of the VM-H 14 to crash.

Significantly, once all access requests or the like at the port 24a and storage device resource 12 have completed and no state information relating to same remains with the storage device resource 12, the storage device resource 12 is removed from the (first) VM-H 14 such that the (first) VM-H 14 no longer owns same, perhaps by way of an eject or the like (step 611), and such storage device resource 12 is then assigned to another VM 14, 16, such another VM 14, 16 now being a second VM-H 14 that owns the storage device resource 12 (step 613). As may be appreciated, performing such removing and assigning acts may be done in any appropriate manner and by any appropriate entity without departing from the spirit and scope of the present invention.

Also significantly, and in one embodiment of the present invention, once the storage device resource 12 has been assigned to the second VM-H 14, the port 24b is coupled to such second VM-H 14 by way of the VM bus 18 or the like (step 615), and access requests or the like queued at such port 24b are then forwarded to such second VM-H 14 for completion at the storage device resource 12 now owned thereby (step 617). As should now be appreciated, at some point all necessary access requests or the like have been sent to the storage device resource 12 by the storage device stack 12 of the first VM-H 14 in the course of the actuated save or migrate thereof, either by way of the port 24a or port 24b, and the storage device resource 12 has processed all such sent access requests or the like (step 619). Accordingly, the save or migrate of the first VM-H 14 may be completed with the knowledge that all access requests from the VM-H 14 for the storage device resource 12 have been acted upon, either directly by way of the port 24a or indirectly by way of the port 24b and the second VM-H 14, and with knowledge that the storage device resource 12 has been ejected from the first VM-H 14 without retaining any state information of such first VM-H 14 (step 621).

As should now be appreciated, re-assignment of the storage device resource 12 to the first VM-H 14 after migration thereof is essentially the opposite of removal as performed at steps 603-621. Accordingly, details of such re-assignment need not be set forth herein in any detail.

Note here that the port 24b of the first VM-H 14 should not convert the generic commands received thereby into specific commands. As such, it is not required that the storage device stack 22 of the second VM-H 14 be anything more than functionally equivalent to the storage device stack 22 of the first VM-H 14. In particular, since such stacks 22 both issue generic commands, such generic commands as received at the port 24 of the second VM-H 14 can be made specific thereby.

CONCLUSION

Although the present invention is at least partially set forth in terms of host and client VMs 14, 16, it is to be appreciated that the present invention is directed toward any situation where a partition or VM that owns hardware is to be migrated. While such migrating VM is likely a host to other clients, it is not necessarily the case that such migrating VM is always such a host to other clients. Moreover, it is to be appreciated that in the course of migration, a VM-H 14 upon relinquish ownership of a hardware device in fact becomes a VM-C 16, at least according to the terminology used herein. As should be appreciated, then, the present invention although properly disclosed in the context of host and client VMs 14, 16 should more properly be considered without regard for terms such as 'host' or 'client', i.e., in terms of a VM owning hardware that is to migrate and, prior to doing so, relinquishing ownership of such hardware to another VM.

The programming necessary to effectuate the processes performed in connection with the present invention is relatively straight-forward and should be apparent to the relevant programming public. In particular, the programming necessary to construct each of the objects shown in FIG. 5 in particular and also to effectuate the steps of FIG. 6 should be apparent based on the functionality necessary for each such object and step. Accordingly, such programming is not attached hereto. Any particular programming, then, may be employed to effectuate the present invention without departing from the spirit and scope thereof.

In the present invention, a method and mechanism is provided for dealing with state information of a VM-H 14 at a resource 12 owned thereby when the VM-H 14 is to be saved or migrated from a first platform to a second platform. The state information at the resource 12 can be deleted from the resource 12 in the ordinary operation thereof prior to the migration, or else can be stored for later retrieval by the VM-H 14 after the migration, or else can be processed by another VM-H 14.

It should be appreciated that changes could be made to the embodiments described above without departing from the inventive concepts thereof. As one example, although the present invention is set forth in terms of a hardware resource 12 with state information of a VM-H 14 such resource 12 may also be another type of resource with state information of a VM-H 14, such as a software resource 12, without departing from the spirit and scope of the present invention. As another example, although the present invention is set forth in terms of a stack 22 and port 24 for accessing the resource 12, such stack 22 and port 24 is intended to include not only stacks and ports, respectively, but any other appropriate accessing mechanisms for accessing the resource 12, all without departing from the spirit and scope of the present invention. It should be understood, therefore, that this invention is not limited to the particular embodiments disclosed, but it is intended to cover modifications within the spirit and scope of the present invention as defined by the appended claims.

What is claimed:

1. A method with regard to a computing system comprising:
   forwarding an access request from a resource stack to be queued at a first port on a first virtual machine (VM), each access request as queued at the first port being further forwarded in turn to the resource to be acted upon by such resource;
   forwarding at least one subsequent access request from the resource stack to be queued at a second port on the first virtual machine; and
   after the resource has acted upon substantially all access requests queued at and forwarded by the first port:
   assigning the resource to a second VM such that the second VM controls the resource; and
   forwarding access request queued at the second port to the resource by way of the second VM to be acted upon by the resource such that the at least one subsequent access request from the resource stack of the first VM are acted upon by the resource in turn after the resource is removed from the first VM and assigned to the second VM; and
   migrating the first VM to a different computing device after assigning the resource to the second VM.

2. The method of claim 1 wherein forwarding the access requests queued at the second port to the resources by way of a VM comprises a VM bus as a communications medium communicatively coupling the first VM and the second VM.

3. The method of claim 1 wherein the resource is a hardware resource.

4. The method of claim 1 wherein the resource is a storage device resource.

5. The method of claim 1 comprising determining that the first VM has been directed to be saved or migrated from a first platform to a second platform prior to assigning the resource to the second VM.

6. The method as recited in claim 1 wherein the first and the second VM are instantiated on a same computing device.

7. The method as recited in claim 1 comprising storing the first VM prior to migrating the first VM to a different computing device.

8. A computing system comprising:
a processor;
a memory in communication with the processor when the system is operational;
computer readable instructions stored in said memory capable of execution by said processor, wherein upon execution by said processor, at least cause:
forwarding of an access request from a resource stack to be queued at a first port on a first virtual machine (VM), each access request as queued at the first port also being forwarded in turn to the resource to be acted upon by such resource;
forwarding of at least one access request from the resource stack to be queued at a second port; and
after the resource has acted upon substantially all access requests queued at and forwarded by the first port:
assigning the resource to a second VM such that the second VM controls the resource; and
forwarding the at least one access request queued at the second port to the resource by way of the second VM to be acted upon by the resource such that all access requests from the resource stack of the first VM are acted upon by the resource in turn even after the resource is removed from the first VM and assigned to the second VM; and
migrating the first VM to a different computing device.

9. The computing system of claim 8 wherein computer readable instructions stored in said memory capable of execution by said processor causing forwarding of the access requests queued at the second port to the resources by way of a VM comprises using a VM bus as a communications medium communicatively coupling the first VM and the second VM.

10. The computing system of claim 8 wherein the resource is a hardware resource.

11. The computing system of claim 8 wherein the resource is a storage device resource.

12. The computing system of claim 8 wherein computer readable instructions stored in said memory capable of execution by said processor cause a determination that the first VM has been directed to be saved or migrated from a first platform to a second platform prior to assigning the resource to the second VM.

13. The computing system of claim 8 wherein the first VM is instantiated on a same computing device as the second VM.

14. The computing system of claim 8 wherein computer readable instructions stored in said memory capable of execution by said processor cause storing the first VM prior to migrating the first VM to a different computing device.

15. A computer readable storage medium having stored thereon computer-readable instructions that upon execution by a computing device cause:
forwarding of an access request from a resource stack to be queued at a first port on a first virtual machine (VM), each access request as queued at the first port being further forwarded in turn to the resource to be acted upon by such resource;
forwarding of at least one additional access request from the resource stack to be queued at a second port; and
after the resource has acted upon substantially the access request queued at and forwarded by the first port:
assigning the resource to a second VM such that the second VM controls the resource; and
forwarding the at least one additional access request queued at the second port to the resource by way of the second VM to be acted upon by the resource such that the access request and the at least one additional access request from the resource stack of the first VM are acted upon by the resource in turn after the resource is removed from the first VM and assigned to the second VM; and
migrating the first VM to a different computing device.

16. The computer readable storage medium of claim 15 wherein computer readable instructions that cause forwarding of the access requests queued at the second port to the resources by way of a VM comprises computer readable instructions for using a VM bus as a communications medium communicatively coupling the first VM and the second VM.

17. The computer readable storage medium of claim 15 wherein the resource is a hardware resource.

18. The computer readable storage medium of claim 15 wherein the resource is a storage device resource.

19. The computer readable storage medium of claim 15 comprising computer readable instructions that cause a determination that the first VM has been directed to be saved or migrated from a first platform to a second platform prior to assigning the resource to the second VM.

20. The computer readable storage medium of claim 15 comprising computer readable instructions that cause storing of the first VM prior to migrating the first VM to a different computing device.

* * * * *